United States Patent
Myokan (10) Patent No.: US 8,482,605 B2
(45) Date of Patent: Jul. 9, 2013

(54) IMAGE PROCESSING DEVICE, IMAGE DISPLAY DEVICE, AND IMAGE PROCESSING AND DISPLAY METHOD AND PROGRAM

(75) Inventor: Yoshihiro Myokan, Kanagawa (JP)

(73) Assignee: Sony Corporation, Tokyo (JP)

( * ) Notice: Subject to any disclaimer, the term of this patent is extended or adjusted under 35 U.S.C. 154(b) by 442 days.

(21) Appl. No.: 12/822,833

(22) Filed: Jun. 24, 2010

(65) Prior Publication Data

US 2011/0001807 A1 Jan. 6, 2011

(30) Foreign Application Priority Data

Jul. 2, 2009 (JP) ................................ P2009-157420

(51) Int. Cl.
*H04N 13/04* (2006.01)
*H04N 13/02* (2006.01)

(52) U.S. Cl.
USPC ................... 348/56; 348/43; 348/46; 348/51; 348/55

(58) Field of Classification Search
USPC .......................................................... 348/56
See application file for complete search history.

(56) References Cited

U.S. PATENT DOCUMENTS

| | | | |
|---|---|---|---|
| 7,522,184 B2 * | 4/2009 | Sun | 348/53 |
| 7,639,893 B2 * | 12/2009 | Duan et al. | 382/274 |
| 2002/0008906 A1 | 1/2002 | Tomita | |
| 2011/0149051 A1 * | 6/2011 | Jang | 348/51 |

FOREIGN PATENT DOCUMENTS

JP 2001-326947 11/2001

* cited by examiner

*Primary Examiner* — David Czekaj
*Assistant Examiner* — Nam Pham
(74) *Attorney, Agent, or Firm* — Finnegan Henderson Farabow Garrett & Dunner LLP (57) ABSTRACT

An image processing device includes a stereoscopic image supply unit configured to supply a stereoscopic moving image in which stereoscopic image pairs each including two images of an object viewed from mutually different viewpoints are arranged in a temporal order, a synthetic image generation unit configured to generate a synthetic image in the temporal order by performing a predetermined operation on luminances of the two images, and an output image selection unit configured to sequentially select and output any one of the two images and the synthetic image in the temporal order so that a result of a time integral during a predetermine period of an output thereof offsets any one of the two images.

11 Claims, 13 Drawing Sheets

IMAGE PROCESSING DEVICE, IMAGE
DISPLAY DEVICE, AND IMAGE
PROCESSING AND DISPLAY METHOD AND
PROGRAM

BACKGROUND OF THE INVENTION

1. Field of the Invention

The present invention relates to an image processing device, and specifically to an image processing device and an image display device for displaying a stereoscopic moving image, a processing and display method of images, and a program that lets a computer execute the method.

2. Description of the Related Art

There have been proposed display systems for displaying a stereoscopic moving image. To display the stereoscopic moving image, stereoscopic image pairs respectively including two images of an object viewed from different viewpoints are displayed in the temporal order using binocular disparity. One of such display systems is the shutter glasses system of displaying two different images alternately in the temporal order and switching between the two images by switching shutters disposed on front surfaces of the glasses between a transmitting state and a light shielding state. In this case, the left and right shutters are controlled separately so that the left shutter is in the transmitting state and the right shutter is in the light shielding state when the image is supplied to the left eye. On the contrary, when the image is supplied to the right eye, the left shutter is in the light shielding state and the right shutter is in the transmitting state. Thus, a viewer can recognize the stereoscopic moving image based on the binocular disparity (see, for example, Japanese Unexamined Patent Application Publication No. 2001-326947 (FIG. 1)).

SUMMARY OF THE INVENTION

With the related art described above, though the viewer wearing the shutter glasses recognizes the stereoscopic effect, a viewer not wearing the shutter glasses recognizes double images including the images respectively viewed from the left and right viewpoints. Therefore, it is uncomfortable for the viewer not wearing the shutter glasses to view the double image. Especially in the case of television broadcasting, various viewing conditions are assumed, and therefore it is desirable to provide a natural image even to viewers not wearing the shutter glasses.

It is therefore desirable to provide an image that makes the viewer wearing shutter glasses recognize the stereoscopic effect and that looks natural to the viewer not wearing the shutter glasses.

An embodiment of the present invention provides an image processing device including a stereoscopic image supply unit configured to supply a stereoscopic moving image in which stereoscopic image pairs each including two images of an object viewed from mutually different viewpoints are arranged in a temporal order, a synthetic image generation unit configured to generate a synthetic image in the temporal order by performing a predetermined operation on luminances of the two images, and an output image selection unit configured to sequentially select and output any one of the two images and the synthetic image in the temporal order so that a result of a time integral during a predetermine period of an output thereof offsets any one of the two images, a processing method of images, and a program that lets a computer execute the method. In this manner, the viewer not wearing shutter glasses can recognize an image in which one of the two images viewed from the mutually different viewpoints is offset, and the two images are independently presented to the left and right eye of the viewer wearing the shutter glasses.

According to the embodiment, the two images may include a left eye image to be presented to the left eye and a right eye image to be presented to the right eye, and the synthetic image generation unit may perform the predetermined operation by applying mutually different codes to the luminances of the left eye image and the right eye image. In this manner, the viewer wearing the shutter glasses can recognize the stereoscopic moving image based on the binocular disparity.

According to the embodiment, an offset value generation unit configured to generate an offset value based on the luminances of the two images may be further included, and the synthetic image generation unit may further perform an addition of the offset value as the predetermined operation. In this manner, the number of pixels with a negative value in the synthetic image does not exceed a predetermined amount. In this case, the offset value generation unit may generate an effective maximum value of values based on the luminances of the two images as the offset value, or generate a value obtained by further smoothing the maximum value in the temporal order as the offset value.

Another embodiment of the present invention provides an image display unit including a stereoscopic image supply unit configured to supply a stereoscopic moving image in which stereoscopic image pairs each including two images of an object viewed from mutually different viewpoints are arranged in a temporal order, the two images being a left eye image to be presented to a left eye and a right eye image to be presented to a right eye, a synthetic image generation unit configured to generate synthetic images in the temporal order by performing a predetermined operation on luminances of the left eye image and the right eye image, an output image selection unit configured to sequentially select and output any one of the left eye image, the right eye image, and the synthetic image in the temporal order so that a result of a time integral during a predetermined period of an output thereof offsets any one of the left eye image and the right eye image, an image display unit configured to display an output image output from the output image selection unit, and a light shield drive unit configured to perform a light shield drive so that the output image is presented to the left eye at an output timing of the left eye image and that the output image is presented to the right eye at the output timing of the right eye image among the output image. In this manner, the viewer not wearing shutter glasses can recognize an image in which one of the left and right images viewed from the mutually different viewpoints is offset, and the viewer wearing the shutter glasses can recognize the stereoscopic moving image.

According to the embodiment, the synthetic image generation unit can perform the predetermined operation by applying mutually different codes to the luminances of the left eye image and the right eye image. In this manner, one of the left eye image and the right eye image can be offset.

According to the embodiment, a light source control unit configured to control a light source of the image display unit to be turned on and off at a cycle shorter than a selection cycle of the output image selection unit may be further included. In this manner, the difference of the luminance level between the cases of wearing and not wearing the shutter glasses can be reduced, and the power consumption can be reduced at the same time.

According to the embodiment, the image display unit can be assumed to output the output image at a frame rate of at least 120 frames per second. To display 30 sets per second where each set includes four images, the frame rate is at least 120 frames per second. According to the embodiment, two times faster rate of 240 frames per second is employed assuming each image is scanned two times.

According to embodiments of the present invention, there can be advantageously provided an image that makes the viewer wearing shutter glasses recognize the stereoscopic effect and that looks natural to the viewer not wearing the shutter glasses.

DESCRIPTION OF THE PREFERRED EMBODIMENTS

Best modes (referred to below as embodiments) for carrying out the present invention will be explained below in the following order.

1. Embodiment (an example without performing a backlight control)
2. Another embodiment (an example of performing the backlight control)<

1. Embodiment

Exemplary Configuration of Image Display System 200

Figure 1:
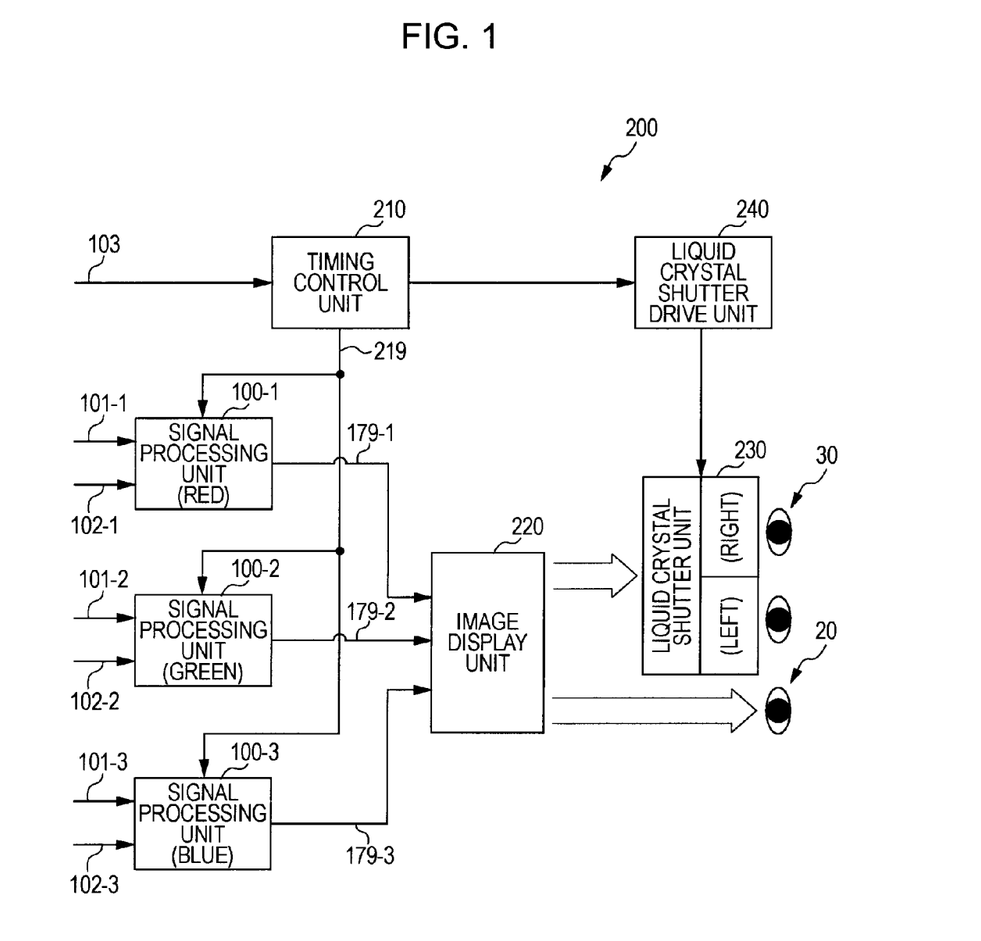
FIG. 1 shows an exemplary configuration of an image display system according to an embodiment of the present invention.

FIG. 1 shows an exemplary configuration of an image display system 200 according to an embodiment of the present invention. The image display system 200 according to the embodiment receives and displays a stereoscopic moving image including images (frames) in stereoscopic image pairs arranged in the temporal order, where each stereoscopic image pair includes two frames of an object viewed from different viewpoints. The two images forming the stereoscopic image pair are a left eye image to be presented to a left eye and a right eye image to be presented to a right eye, which collectively make a viewer recognize stereoscopic effect by the binocular disparity.

It is assumed herein to use image signals in an RGB color space as input signals, where each of the left eye image and the right eye image includes a red (R) signal, a green (G) signal, and a blue (B) signal. Specifically, the image display system 200 receives a red signal 101-1, a green signal 101-2, and a blue signal 101-3 of the left eye image and a red signal 102-1, a green signal 102-2, and a blue signal 102-3 of the right eye image. The signals of the left eye image are collectively referred to below as a left eye image signal 101, and the signals of the right eye image are collectively referred to below as a right eye image signal 102. The image display system 200 also receives a vertical synchronization signal 103 indicative of a vertical synchronization timing in an image display unit.

The image display system 200 includes signal processing units 100-1 to 100-3, a timing control unit 210, an image display unit 220, a liquid crystal shutter unit 230, and a liquid crystal shutter drive unit 240.

The signal processing units 100-1 to 100-3 perform a predetermined process on the left eye image signal 101 and the right eye image signal 102. The signal processing unit 100-1 receives the red signal 101-1 of the left eye image and the red signal 102-1 of the right eye image, and outputs a red signal 179-1 of an output image. The signal processing unit 100-2 receives the green signal 101-2 of the left eye image and the green signal 102-2 of the right eye image, and outputs a green signal 179-2 of the output image. The signal processing unit 100-3 receives the blue signal 101-3 of the left eye image and the blue signal 102-3 of the right eye image, and outputs a blue signal 179-3 of the output image. The red signal 179-1, the green signal 179-2, and the blue signal 179-3 of the output image are collectively referred to below as an output image signal 179. The signal processing units 100-1 to 100-3 are also collectively referred to below as a signal processing unit 100.

The timing control unit 210 generates a timing signal in each unit and controls its operation timing based on the input vertical synchronization signal 103. For example, the timing control unit 210 generates a selection signal 219 of the output image in the signal processing unit 100. The timing control unit 210 also supplies a reference timing signal for driving the liquid crystal shutter unit 230 to the liquid crystal shutter drive unit 240.

The image display unit 220 displays an image based on the output image signals 179-1 to 179-3 output from the signal processing units 100-1 to 100-3. The image display unit 220 scans each pixel on a screen in accordance with a display reference timing signal (not shown). That is, drawing is performed along a horizontal line from a top left pixel to a top right pixel on the screen, and the drawing is repeated on every other horizontal line in a case of an interlaced system. In this case, two fields form a single frame. In a case of a non-interlaced system, when the drawing along a horizontal line is complete, the drawing is then performed on the next horizontal line immediately below. In both cases, upon reaching the final line in the field or the frame, then the drawing moves to the top line of the next field or frame after a vertical blanking interval. The vertical blanking interval is indicated by the vertical synchronization signal 103 described above.

The image displayed by the image display unit 220 is, as will be described later, recognized by a viewer 30 who uses the liquid crystal shutter unit 230 as a stereoscopic image, and recognized by a viewer 20 who does not use the liquid crystal shutter unit 230 as a plane image. In other words, the viewer 20 who does not use the liquid crystal shutter unit 230 can recognize the normal plane image without recognizing double images including images viewed from left and right viewpoints as with the related art in the past.

The liquid crystal shutter unit 230 is a pair of shutter glasses for presenting the image displayed by the image display unit 220 independently to the left and right eyes of the viewer 30. The liquid crystal shutter unit 230 includes left and right shutters controlled to open and close by applying or not applying a voltage, which are independently controlled to transmit or shield a light. The timing of opening and closing the left and right shutters of the liquid crystal shutter unit 230 is controlled by the liquid crystal shutter drive unit 240.

The liquid crystal shutter drive unit 240 drives the liquid crystal shutter unit 230. In other words, the liquid crystal shutter drive unit 240 controls the shutter for the left eye or the right eye of the liquid crystal shutter unit 230 to open and close at the timing to be described later. The liquid crystal shutter drive unit 240 is an example of a light shield drive unit according to an embodiment of the present invention.

[Exemplary Configuration of Signal Processing Unit 100]

Figure 2:
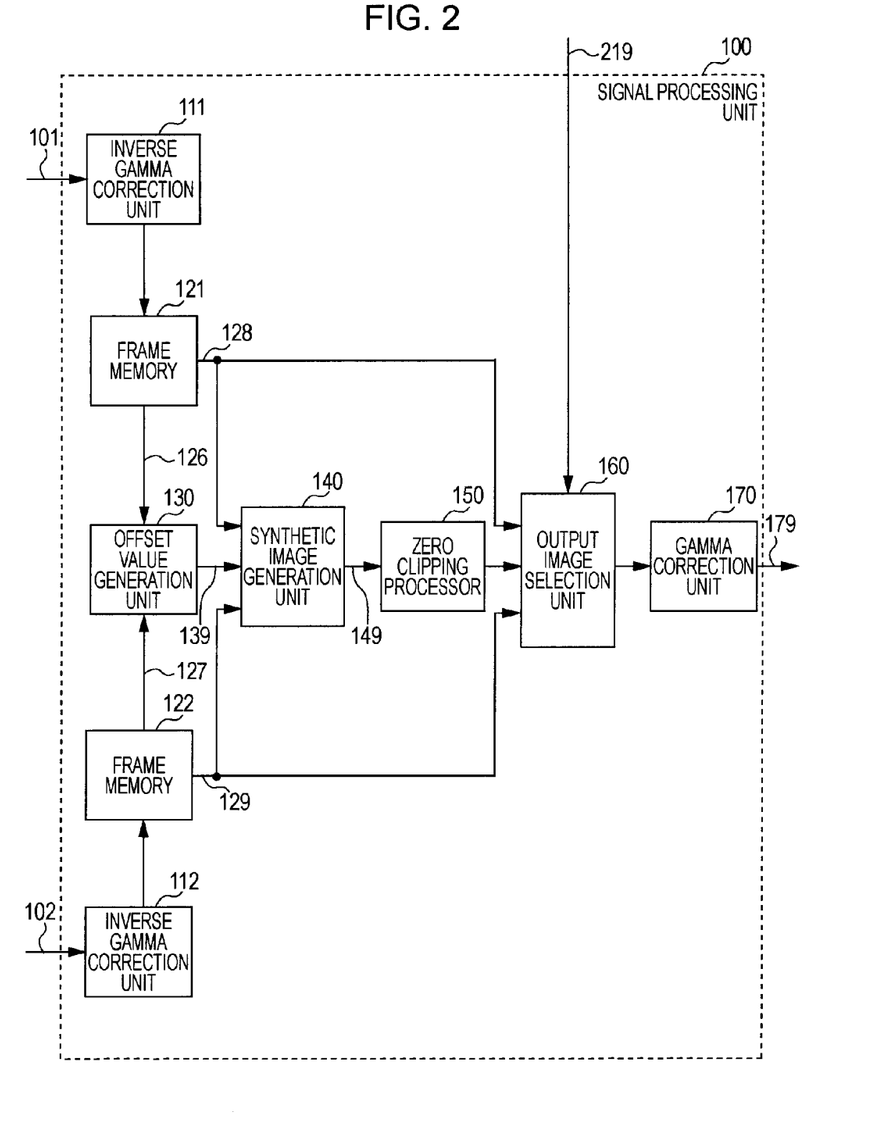
FIG. 2 shows an exemplary configuration of a signal processing unit according to the embodiment.

FIG. 2 shows an exemplary configuration of a signal processing unit 100 according to the embodiment. The signal processing unit 100 includes inverse gamma correction units 111 and 112, frame memories 121 and 122, an offset value generation unit 130, a synthetic image generation unit 140, a zero clipping processor 150, an output image selection unit 160, and a gamma correction unit 170.

The inverse gamma correction units 111 and 112 perform an inverse correction so that a relation between a shift of an intensity of each light in R, G, and B emitted from the image display unit 220 and a signal level handled by the synthetic image generation unit 140 is linear. The inverse gamma correction unit 111 is supplied with the left eye image signal 101, and the inverse gamma correction unit 112 is supplied with the right eye image signal 102.

Figure 3:
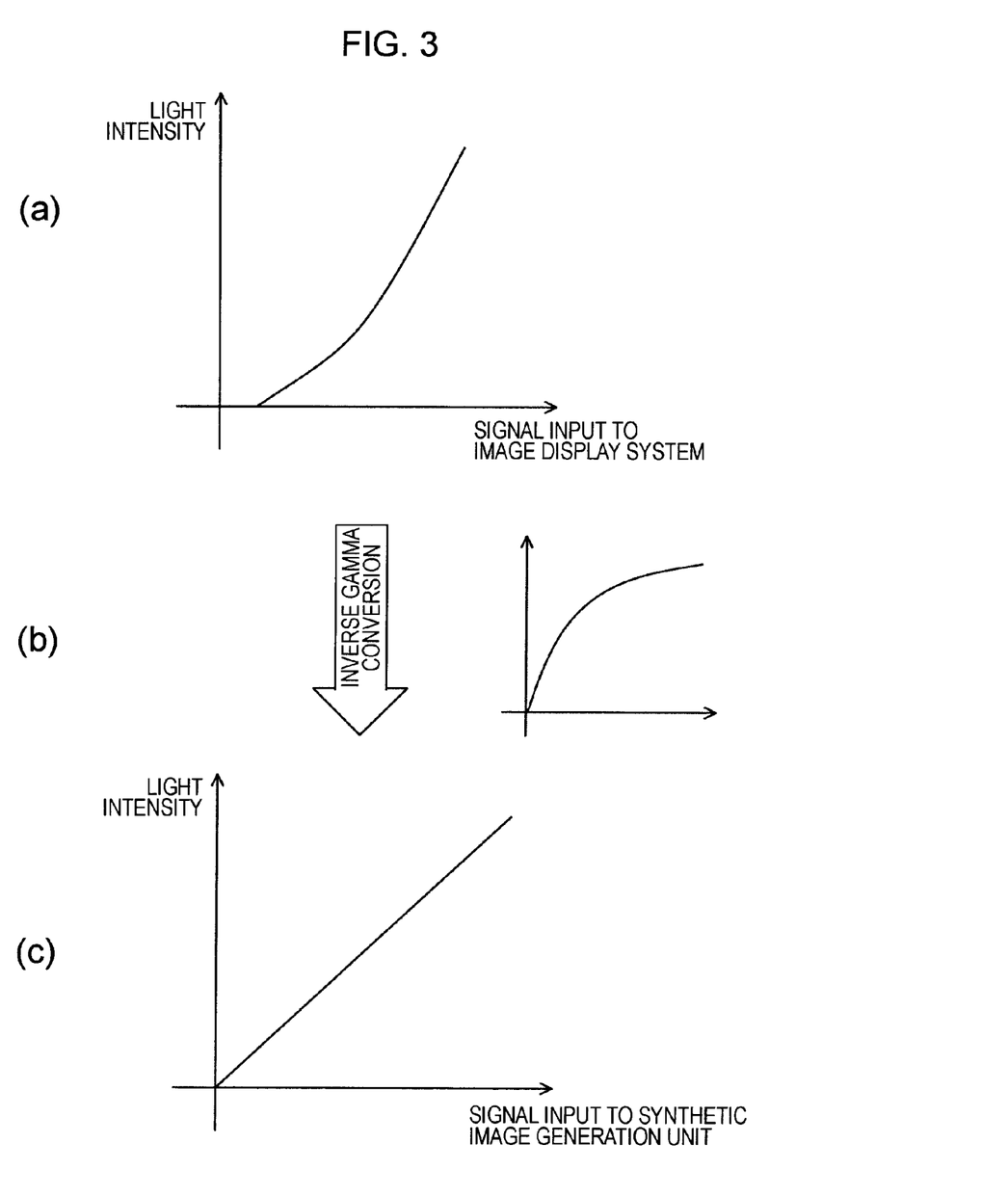
FIG. 3 shows an exemplary process performed by inverse gamma correction units according to the embodiment.

As shown in a chart (a) in FIG. 3, the signal input to the image display system 200 and the RGB light intensity are not in a linear relation, and it will be difficult for the synthetic image generation unit 140 to handle them as they are. Therefore, the inverse gamma correction units 111 and 112 perform an inverse gamma conversion to correct the values by multiplying by a curve as shown in a chart (b) in FIG. 3. In this manner, as shown in a chart (c) in FIG. 3, the signal and the RGB light intensity in the synthetic image generation unit 140 comes into the linear relation. However, instead of multiplying by the curve shown in the chart (b) in FIG. 3, the desired values can be obtained by, for example, referring to a look up table (LUT).

The frame memories 121 and 122 store images inverse gamma-converted by the inverse gamma correction units 111 and 112, respectively. The frame memory 121 stores an output from the inverse gamma correction unit 111, and the frame memory 122 stores an output from the inverse gamma correction unit 112. The frame memories 121 and 122 temporarily store the inverse gamma-converted images, thereby performing a delay processing on a video frame to enable a synchronization of input and output timings. Each of the frame memories 121 and 122 has a capacity large enough to store at least one frame, and it is more desirable to store a plurality of frames because an accuracy of an offset value can be improved at the time of generating the offset value to be described later. The frame memories 121 and 122 are an example of a stereoscopic image supply unit according to an embodiment of the present invention.

The offset value generation unit 130 generates an offset value a used when the synthetic image generation unit 140 generates a synthetic image. The offset value a is to be added to an output from the synthetic image generation unit 140 so that the number of pixels with a negative value should not exceed a predetermined amount. This is because the synthetic image generation unit 140 does not present a negative value from a light and the overall values should be raised. An exemplary configuration of the offset value generation unit 130 will be described later with reference to an accompanying drawing.

The synthetic image generation unit 140 generates the synthetic image by performing a predetermined operation on luminances of the left eye image and the right eye image in the temporal order. The synthetic image is generated by controlling the image display unit 220 to display the left eye image and the right eye image switched between them in the temporal order so that a time-integrated result of the output during a predetermined period offsets either one of the left eye image and the right eye image. An exemplary configuration of the synthetic image generation unit 140 will be described later with reference to an accompanying drawing.

The zero clipping processor 150 rounds up any negative value to zero in a case where the output from the synthetic image generation unit 140 is negative. Because the offset value α generated by the offset value generation unit 130 is added to the output from the synthetic image generation unit 140, the overall outputs are raised so that the number of pixels with the negative value should not exceed the predetermined amount. However, to avoid a risk of collapsing an entire image by raising the outputs too much based on few exceptional pixels, a zero clipping is performed when the output from the synthetic image generation unit 140 is negative.

The output image selection unit 160 selects and outputs any one of the left eye image and the right eye image stored in the frame memories 121 and 122 and the synthetic image output from the zero clipping processor 150 as an output image. The selection performed by the output image selection unit 160 is based on a selection signal 219 supplied from the timing control unit 210. The timing of the selection performed by the output image selection unit 160 will be described later with reference to an accompanying drawing.

The gamma correction unit 170 performs a conversion process inverse to the process performed by the inverse gamma correction units 111 and 112. More specifically, the gamma correction unit 170 performs a conversion so that the shift of the signal level of the output image output from the output image selection unit 160 is in the linear relation with the intensity of each light in R, G, and B emitted from the image display unit 220. The desired value can be obtained by, for example, referring to an LUT in the process performed by the gamma correction unit 170, as with the process performed by the inverse gamma correction units 111 and 112.

[Exemplary Configuration of Offset Value Generation Unit 130]

Figure 4:
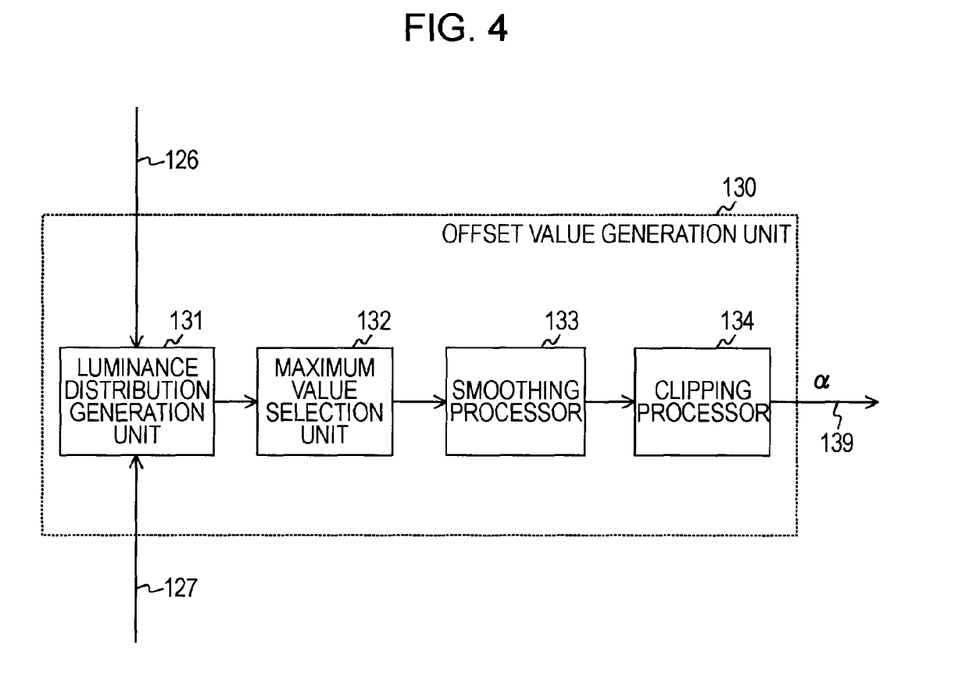
FIG. 4 shows an exemplary configuration of an offset value generation unit according to the embodiment.

FIG. 4 shows an exemplary configuration of the offset value generation unit 130 according to the embodiment. The offset value generation unit 130 includes a luminance distribution generation unit 131, a maximum value selection unit 132, a smoothing processor 133, and a clipping processor 134.

Figure 5:
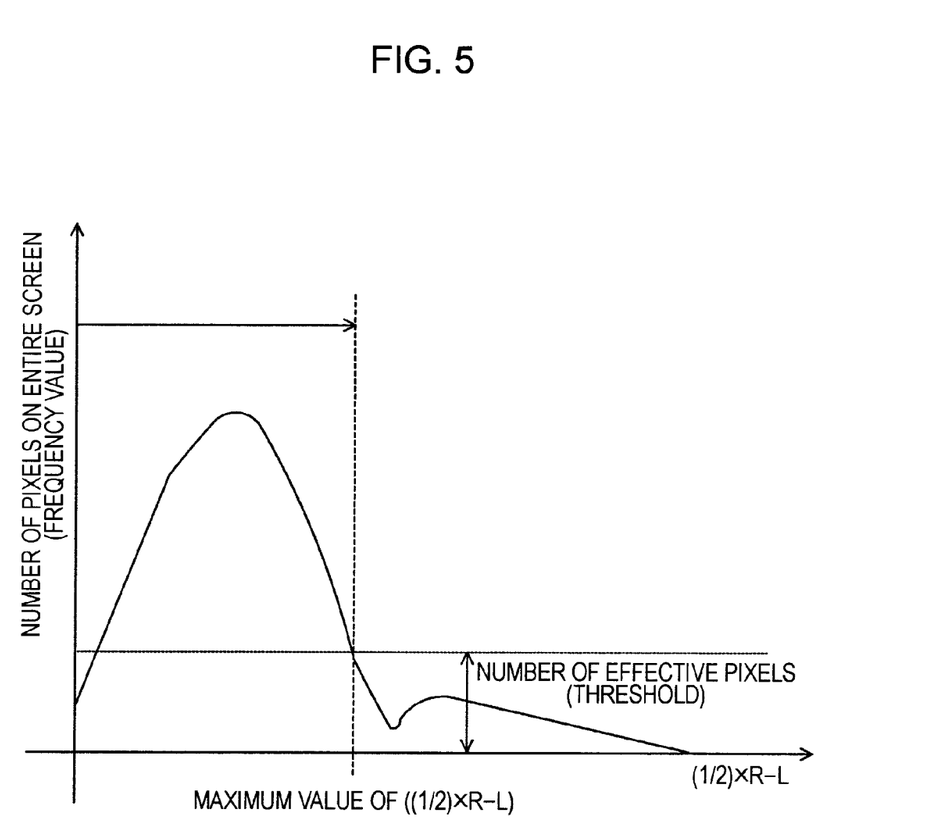
FIG. 5 shows an exemplary luminance distribution according to the embodiment.

The luminance distribution generation unit 131 generates luminance distributions of a left eye image 126 and a right eye image 127 from the frame memories 121 and 122. In this example, a synthetic image X is assumed $$X = L - (1/2) \times R + \alpha,$$

and a distribution of the offset value α is considered so that the synthetic image X does not become a negative value. Here, L is the left eye image, and R is the right eye image. Because an offset value α0 at a limiting point where each pixel of the synthetic image X becomes zero is $$0 = L - (1/2) \times R + \alpha_0, \text{ and}$$

$$\alpha_0 = L + (1/2) \times R,$$

the luminance distribution of $\alpha_0$ is obtained here. This process is shown in FIG. 5.

Figure 6:
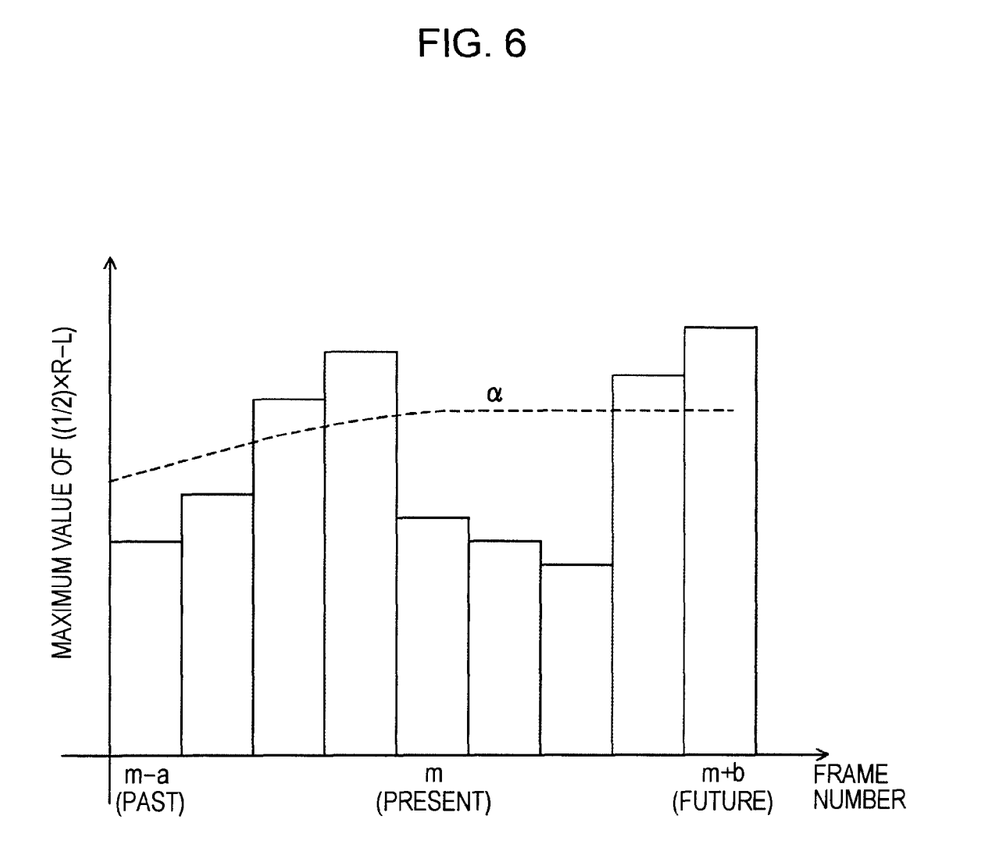
FIG. 6 shows an exemplary smoothing process according to the embodiment.

The maximum value selection unit 132 selects the maximum value from among the luminance distribution generated by the luminance distribution generation unit 131. An explanation is given below with reference to FIG. 5. FIG. 5 shows an exemplary luminance distribution according to the embodiment. In FIG. 5, the horizontal axis indicates "(1/2)× R−L", and the vertical axis indicates the frequency value of each luminance on the entire screen (frame). To obtain the maximum value of "(1/2)×R−L" in such a luminance distribution, if few exceptional pixels are taken into consideration, there is a risk that the entire image be collapsed by too high an offset value α. To avoid such a risk, the number of effective pixels is set as a threshold, and the maximum value of "(1/2)× R−L" is obtained from within a range where the number of pixels exceeds the threshold. FIG. 6 shows the maximum values of "(1/2)×R−L" obtained in this manner, arranged with respect to each frame.

The smoothing processor 133 performs a smoothing process on the maximum values selected by the maximum value selection unit 132 over the frame. An explanation is given below with reference to FIG. 6. FIG. 6 shows an exemplary smoothing process according to the embodiment. In FIG. 6, the maximum values of "(1/2)×R−L" are arranged with respect to each frame. More specifically, centered at the maximum value of "(1/2)×R−L" in a present frame m, the maximum value in a frame "m−a" which is a frames before is arranged to the left and the maximum value in a frame "m+b" which is b frames ahead is arranged to the right. Each of them can be used as an offset value α for each frame, but it is not desirable because the total brightness of the screen may suddenly change if the offset value α greatly changes in a short time. Therefore, the smoothing processor 133 computes the offset value α by smoothing the maximum values over adjacent frames as indicated by a dashed line shown in FIG. 6.

The clipping processor 134 performs a clipping process so that the offset value α stays within an appropriate range between the maximum value and the minimum value. For example, the offset value α may be adjusted to range between 0% and 70% of the full range of the luminance.

[Exemplary Configuration of Synthetic Image Generation Unit 140]

Figure 7:
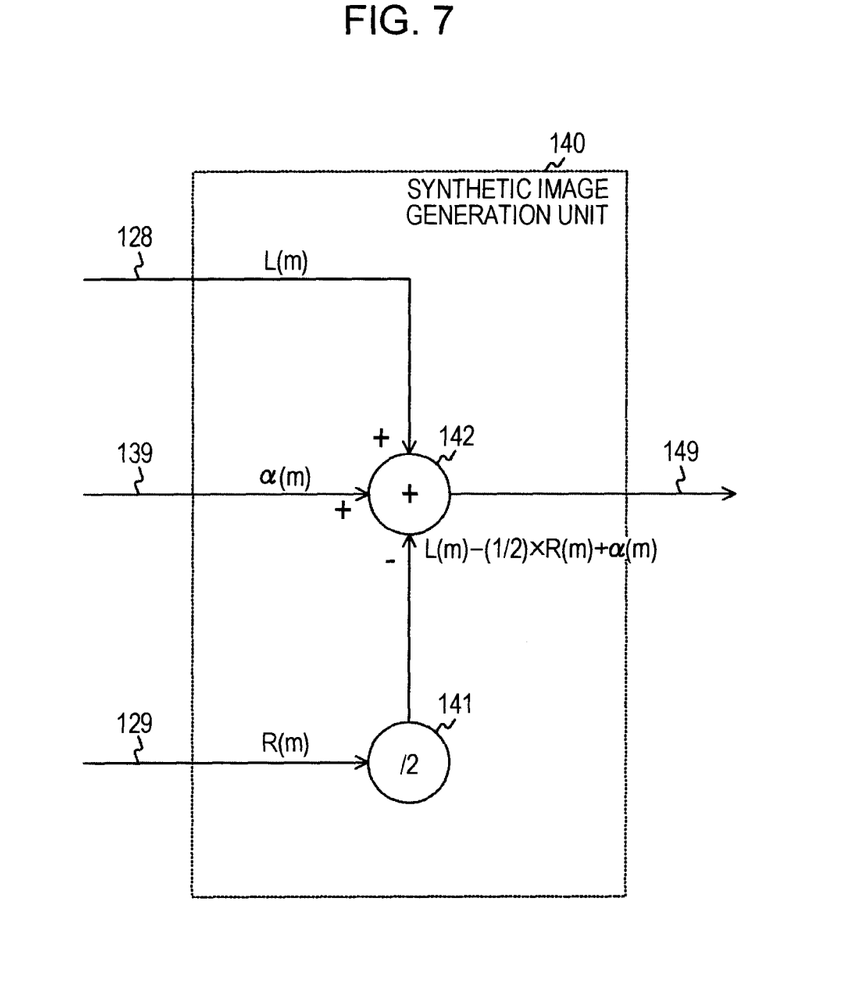
FIG. 7 shows an exemplary configuration of a synthetic image generation unit according to the embodiment.

FIG. 7 shows an exemplary configuration of the synthetic image generation unit 140 according to the embodiment. An explanation is given below using the synthetic image X=L−(1/2)×R+α as in the example described above. The synthetic image generation unit 140 includes a divider 141 and an adder 142.

The divider 141 performs a division of dividing a right eye image 129 from the frame memory 122 by "2". Because the luminance value of the image is an integer, the division can be easily performed by a shifter shifting one bit to the right.

The adder 142 performs a subtraction on the result output from the divider 141 by adding a left eye image 128 from the frame memory 121 and an offset value 139 output from the offset value generation unit 130 thereto. In FIG. 7, (m) indicates a pixel of the present frame m. The output from the adder 142 is supplied to the zero clipping processor 150.

[Exemplary Timing of Operation Performed by Image Display System 200]

Figure 8:
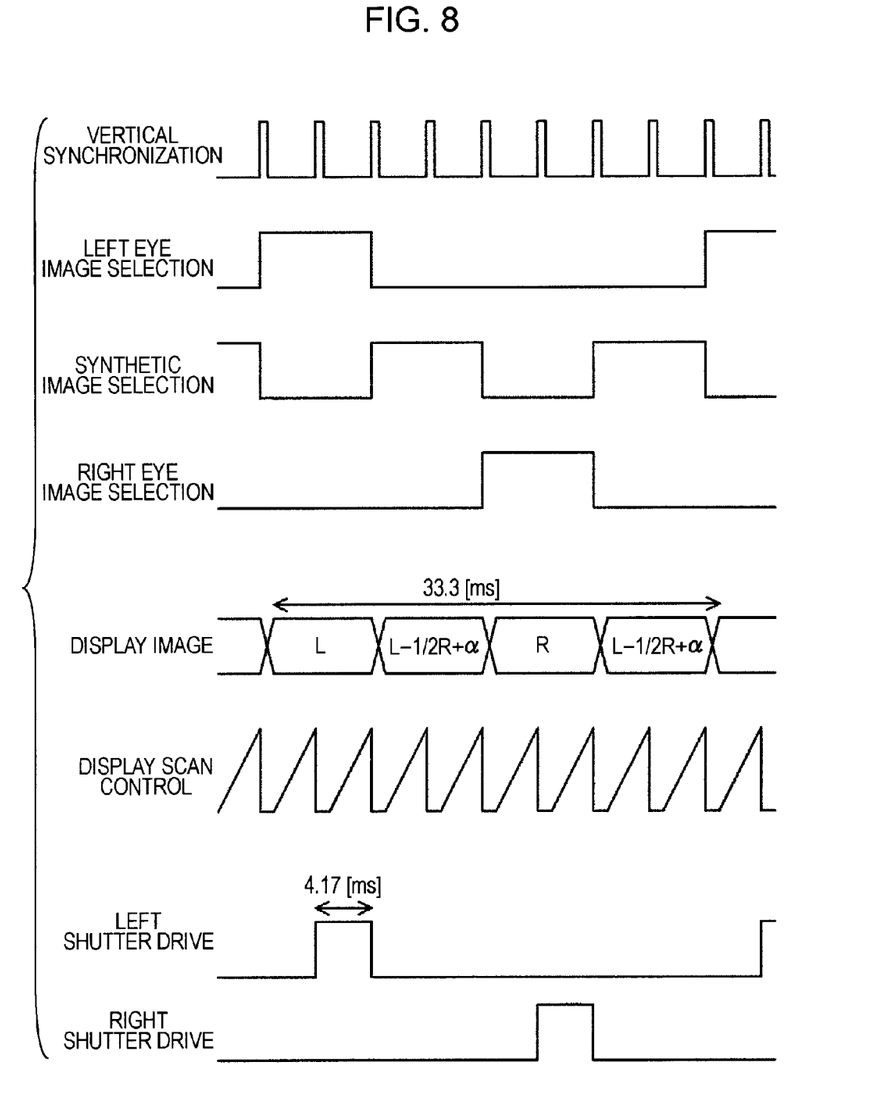
FIG. 8 shows exemplary timings of operations performed by the image display system according to the embodiment.

FIG. 8 shows exemplary timings of operations performed by the image display system 200 according to the embodiment. Based on the vertical synchronization signal 103, the timing control unit 210 generates a selection signal supplied to the output image selection unit 160. In this example, the output image selection unit 160 performs the selection in the order of the left eye image L, the synthetic image (L−(1/2)× R+α), the right eye image R, and then the synthetic image (L−(1/2)×R+α).

To display 30 sets per second where each set includes four of the above images, each set is displayed for 33.3 milliseconds (ms). Assuming that each image is scanned two times, a single scan is performed every 4.17 ms. That is, in this case, the image is displayed at a frame rate of $$30 \times 4 \times 2 = 240 \text{ frames/second (fps)}.$$

Although each image is scanned two times in this example, the image may be displayed at a frame rate of 120 frames/second, which is half of the rate in the example, providing that each image is scanned only once.

Figure 9A:
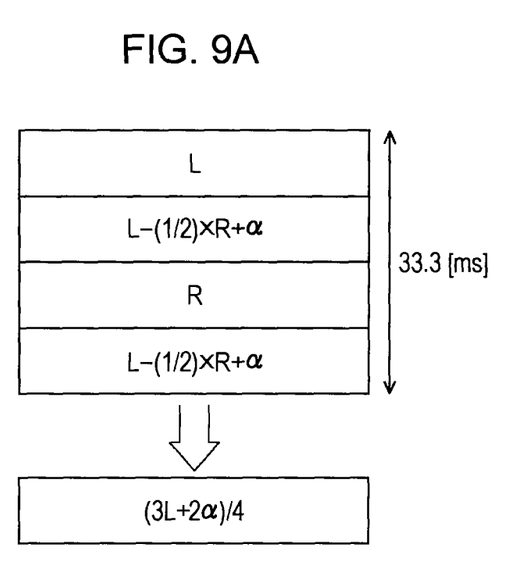
FIGS. 9A and 9B show images recognized by a viewer according to the embodiment for comparison.
Figure 9B:
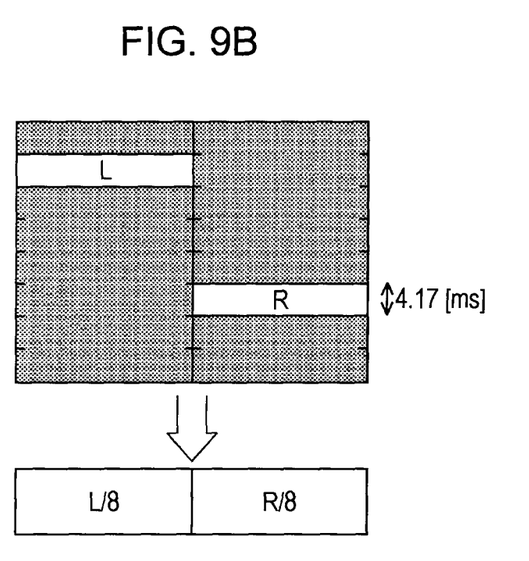

FIGS. 9A and 9B show images recognized by the viewer according to the embodiment for comparison. FIG. 9A shows an image recognized by a viewer without using the liquid crystal shutter unit 230. That is, the image selected by the output image selection unit 160 in the order of the left eye image L, the synthetic image (L−(1/2)×R+a), the right eye image R, and then the synthetic image (L−(1/2)×R+a) is recognized as described below based on the time integral in the retina.

$$(L+(L-(1/2)\times R+\alpha)+R+(L-(1/2)\times R+\alpha))/4 = (3L+2\alpha)/4$$

In other words, because the display image "(3L+2α)/4" does not include an element of the right eye image R, the viewer recognizes the left eye image L, thereby avoiding the double images as viewed in the past.

FIG. 9B shows an image recognized by a viewer through the liquid crystal shutter unit 230. That is, because a left eye shutter becomes transparent at the timing of the left eye image L being selected and it is light-shielding at other times, the left eye image L is presented to the left eye. In the same manner, because a right eye shutter becomes transparent at the timing of the right eye image R being selected and it is light-shielding at other times, the right eye image R is presented to the right eye. However, because they become transparent for only 1/8 of the overall time, the left eye recognizes "L/8" of the stereoscopic image and the right eye recognizes "R/8" of the stereoscopic image.

[Exemplary Process Performed by Image Display System 200]

Figure 10:
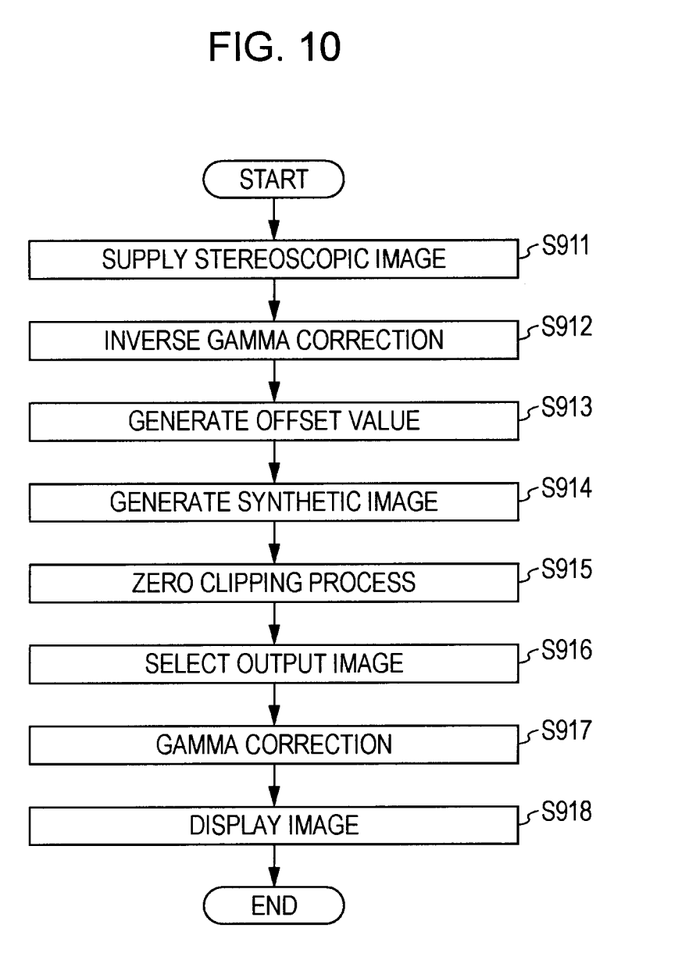
FIG. 10 is a flowchart showing an exemplary process performed by the image display system according to the embodiment.

FIG. 10 is a flowchart showing an exemplary process performed by the image display system 200 according to the embodiment. First, when the left eye image signal 101 and the right eye image signal 102 are input (Step S911), the inverse gamma correction units 111 and 112 of the signal processing unit 100 perform the inverse gamma correction (Step S912) and store them in the frame memories 121 and 122, respectively. The offset value generation unit 130 generates the offset value from the left eye image and the right eye image stored in the frame memories 121 and 122 (Step S913).

The synthetic image generation unit 140 generates the synthetic image from the left eye image and the right eye image stored in the frame memories 121 and 122 and the offset value (Step S914). The zero clipping processor 150 then performs the process of rounding up to zero on a negative pixel value in the synthetic image (Step S915).

The output image selection unit 160 sequentially selects any one of the left eye image, the right eye image, and the synthetic image, and outputs the selected image as the output image (Step S916). The gamma correction unit 170 gamma-corrects the output image and outputs it to the image display unit 220 (Step S917). The image display unit 220 displays the gamma-corrected output image (Step S918).

Step S911 is an example of the step of supplying the stereoscopic image according to an embodiment of the present invention. Step S914 is an example of the step of generating the synthetic image according to an embodiment of the present invention. Step S916 is an example of the step of selecting the output image according to an embodiment of the present invention.

As described above, according to the embodiment, there can be provided an image that makes the viewer using the liquid crystal shutter unit 230 recognize the stereoscopic effect based on the binocular disparity and that looks natural to the viewer without using the liquid crystal shutter unit 230.

2. Another Embodiment

Exemplary Configuration of Image Display System 200

Figure 11:
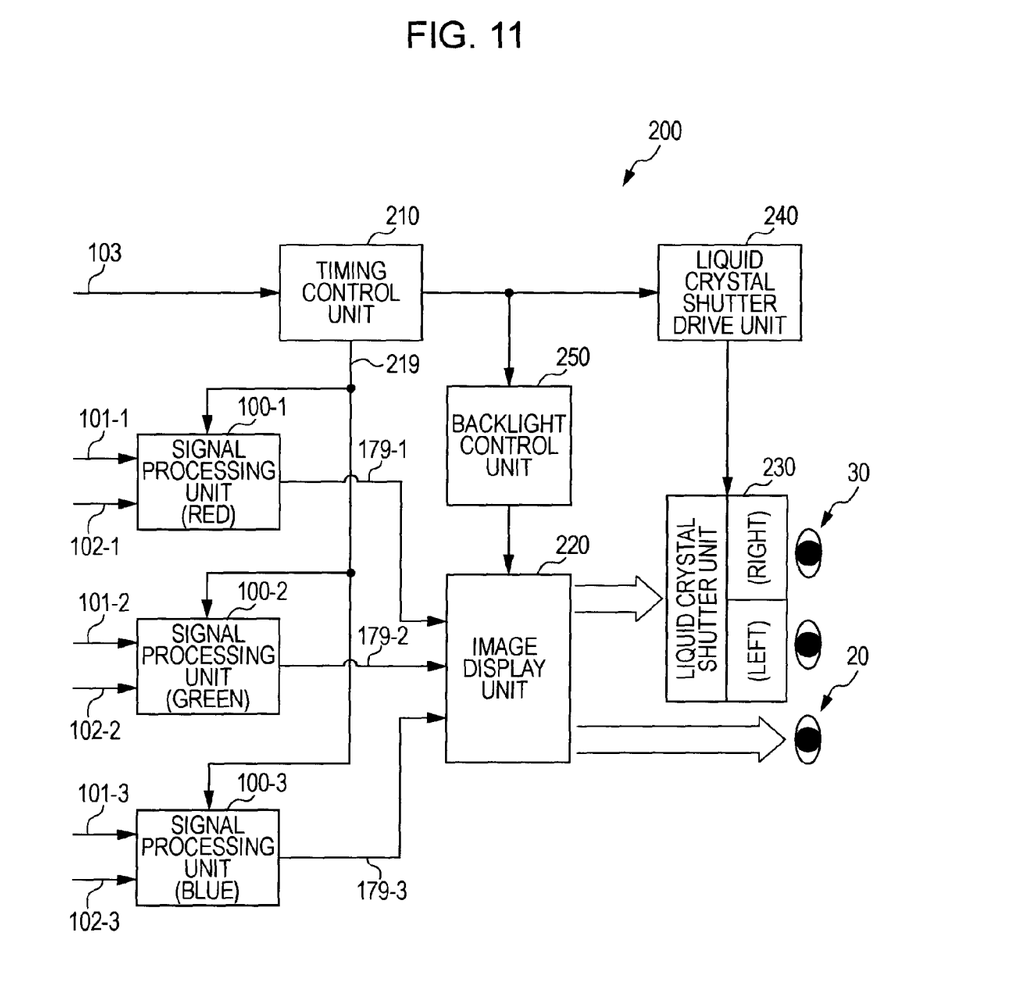
FIG. 11 shows an exemplary configuration of an image display system according to another embodiment of the present invention.

FIG. 11 shows an exemplary configuration of an image display system 200 according to another embodiment of the present invention. The image display system 200 according to the embodiment has the same configuration as the image display system 200 according to the embodiment described earlier except that a backlight control unit 250 is provided. The explanation of the configuration except the backlight control unit 250 is therefore omitted. The image display unit 220 is assumed herein as a liquid crystal display using a backlight as its light source.

The backlight control unit 250 controls a light emission timing of a backlight in the image display unit 220. In the embodiment described earlier, the backlight is not specially controlled assuming that the backlight keeps emitting a light. However, as described with reference to FIGS. 9A and 9B, because the luminance level drops to ⅛ in the case of using the liquid crystal shutter unit 230, the difference from the case of not using the liquid crystal shutter unit 230 is large. Therefore, according to the present embodiment, the backlight control unit 250 controls the light emission timing of the backlight, thereby reducing the difference of the luminance level between the cases of using and not using the liquid crystal shutter unit 230 and reducing power consumption at the same time.

[Exemplary Timing of Operation Performed by Image Display System 200]

Figure 12:
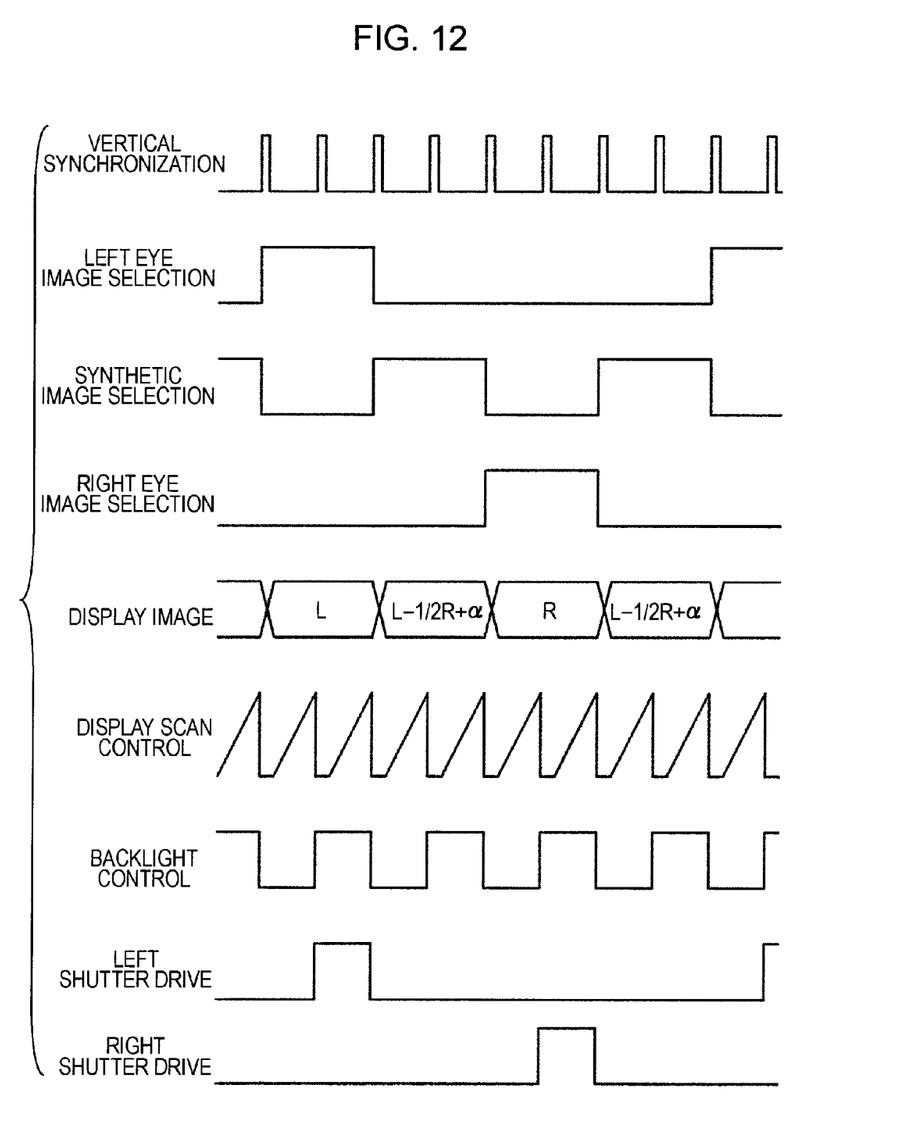
FIG. 12 shows an exemplary timing of an operation performed by the image display system according to the other embodiment.

FIG. 12 shows an exemplary timing of an operation performed by the image display system 200 according to the embodiment. In this example, the backlight control unit 250 controls the light emission timing of the backlight to emit the light every other frame so as to repeat a light emission and a non-light emission. In other words, on the assumption that the display image be switched with respect to each two frames, the light is not emitted in the first frame and the light is emitted in the second frame.

Figure 13A:
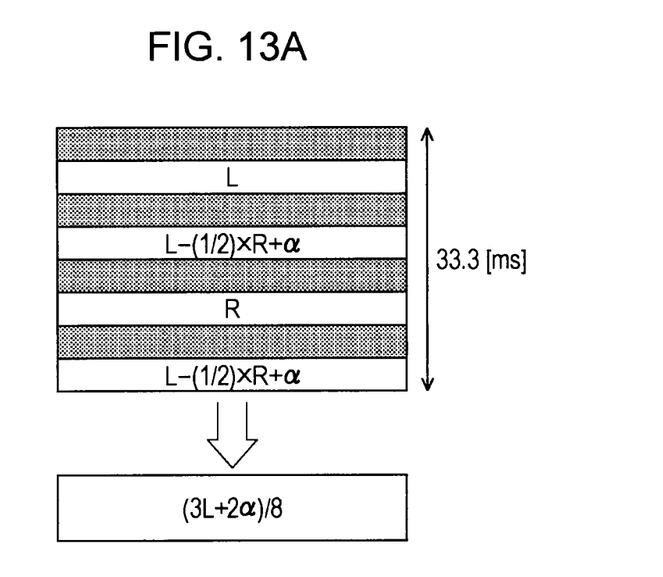
FIGS. 13A and 13B show images recognized by a viewer according to the other embodiment for comparison.
Figure 13B:
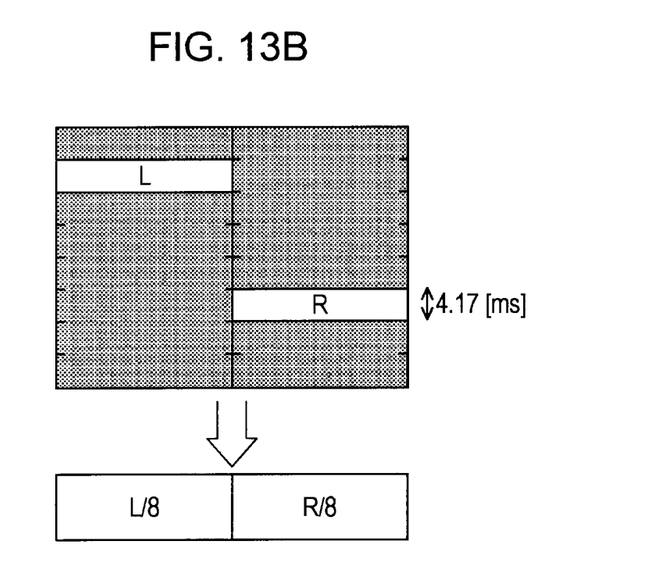

FIGS. 13A and 13B show images recognized by the viewer according to the embodiment for comparison. FIG. 13A shows an image recognized by the viewer without using the liquid crystal shutter unit 230. That is, only half of the image selected by the output image selection unit 160 in the order of the left eye image L, the synthetic image (L−(½)×R+α), the right eye image R, and then the synthetic image (L−(½)×R+α) is presented to the viewer due to the backlight control. Therefore, the image is recognized as described below based on the time integral in the retina.

$$(L+(L-(½)×R+α)+R+(L-(½)×R+α))/8=(3L+2α)/8$$

Because the display image "(3L+2α)/8" does not include an element of the right image R, the viewer recognizes the left eye image L as in the embodiment described earlier. However, in the present embodiment, the luminance level is half compared with the embodiment described earlier (FIGS. 9A and 9B).

FIG. 13B shows an image recognized by the viewer through the liquid crystal shutter unit 230. FIG. 13B shows the same result as in the embodiment described earlier. That is, the left eye recognizes "L/8" of the stereoscopic image and the right eye recognizes "R/8" of the stereoscopic image.

As described above, according to the embodiment, in addition to the effects brought by the embodiment described earlier, the difference of the luminance level between the cases of using and not using the liquid crystal shutter unit 230 can be reduced, and the power consumption can be reduced at the same time.

Although the embodiment was explained taking an example of offsetting the right eye image R, the left and the right may be switched to offset the left eye image L. Although the synthetic image (L−(½)×R+α) was used making a set of four images in the embodiment, the number of the images can be altered as desired. In such a case, the synthetic image is generated so that any one of the left and right images is offset by the time integral in a pair of retinas.

Although the offset value α was calculated from the maximum value of ((½)×R−L) in the embodiment, the maximum values of the left and right images may be calculated separately to obtain the offset value. Alternatively, a predetermined fixed value such as gray may be set as the offset value without depending on the left and right images.

The embodiments of the present invention show merely examples for carrying out the present invention, and, as defined in the embodiments, each of the matters in the embodiments of the present invention has a corresponding relation with each of the invention-specifying matters in the claims. In the same manner, each of the invention-specifying matters in the claims has a corresponding relation with a matter in the embodiments having the same name. However, the present invention is not limited to the embodiments, and can be realized by making various modifications to the embodiments without departing from the scope of the present invention.

The processes explained in the embodiments may be understood as a method including a series of the procedures, a program that lets a computer execute the series of the procedures, or a recording medium that stores the program. The recording medium may be, for example, a compact disc (CD), a MiniDisc (MD), a digital versatile disk (DVD), a memory card, or a Blu-ray Disc®.

The present application contains subject matter related to that disclosed in Japanese Priority Patent Application JP 2009-157420 filed in the Japan Patent Office on Jul. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a stereoscopic image supply unit configured to supply a stereoscopic moving image in which stereoscopic image pairs each including two images of an object viewed from mutually different viewpoints are arranged in a temporal order;
a synthetic image generation unit configured to generate a synthetic image in the temporal order by performing a predetermined operation on luminance values of the two images,
wherein the predetermined operation comprises dividing the luminance value of each pixel in one image by two, the result of which is subtracted from the luminance value of each corresponding pixel in another image; and
an output image selection unit configured to sequentially select and output any one of the two images and the synthetic image in the temporal order so that a result of a time integral during a predetermine period of an output thereof offsets any one of the two images.

2. The image processing device according to claim 1, wherein the two images include a left eye image to be presented to a left eye and a right eye image to be presented to a right eye, and
wherein the synthetic image generation unit performs mutually different predetermined operations on the luminance values of the left eye image and the right eye image.

3. The image processing device according to claim 1 further comprising:
an offset value generation unit configured to generate an offset value based on the results of subtracting the luminance values of the pixels in another image from the dividing results of the luminance values of the pixels in the one image,
wherein the predetermined operation further comprises adding the offset value.

4. The image processing device according to claim 3, wherein the offset value generation unit generates the offset value by selecting the maximum value from among the results of subtracting the luminance values of the pixels in another image from the dividing results of the luminance values of the pixels in one image.

5. The image processing device according to claim 4, wherein the offset value generation unit generates the offset value by smoothing maximum values generated over a plurality of images in the temporal order.

6. An image display unit comprising:
a stereoscopic image supply unit configured to supply a stereoscopic moving image in which stereoscopic image pairs each including two images of an object viewed from mutually different viewpoints are arranged in a temporal order, the two images being a left eye image to be presented to a left eye and a right eye image to be presented to a right eye;
a synthetic image generation unit configured to generate synthetic images in the temporal order by performing a predetermined operation on luminance values of the left eye image and the right eye image,
wherein the predetermined operation comprises dividing the luminance value of each pixel in one image of the two images by two, the result of which is subtracted from the luminance value of each corresponding pixel in another image of the two images;
an output image selection unit configured to sequentially select and output any one of the left eye image, the right eye image, and the synthetic image in the temporal order so that a result of a time integral during a predetermined period of an output thereof offsets any one of the left eye image and the right eye image;
an image display unit configured to display an output image output from the output image selection unit; and
a light shield drive unit configured to perform a light shield drive so that the output image is presented to the left eye at an output timing of the left eye image and that the output image is presented to the right eye at the output timing of the right eye image among the output image.

7. The image display unit according to claim 6, wherein the synthetic image generation unit performs mutually different predetermined operations on the luminance values of the left eye image and the right eye image.

8. The image display unit according to claim 6, further comprising a light source control unit configured to control a light source of the image display unit to emit the light at a cycle of every other image.

9. The image display unit according to claim 6, wherein the image display unit outputs the output display at a frame rate of at least 120 frames per second.

10. An image processing method comprising the steps of:
supplying a stereoscopic moving image in which stereoscopic image pairs each including two images of an object viewed from mutually different viewpoints are arranged in a temporal order;
generating a synthetic image in the temporal order by performing a predetermined operation on luminance values of the two images,
wherein the predetermined operation comprises dividing the luminance value of each pixel in one image by two, the result of which is subtracted from the luminance value of each corresponding pixel in another image; and
sequentially selecting and outputting any one of the two images and the synthetic image in the temporal order so that a result of a time integral during a predetermine period of an output thereof offsets any one of the two images.

11. A program embodied on a non-transitory and computer readable medium that, when executed by a processor, causes a computer to execute the steps of:
supplying a stereoscopic moving image in which stereoscopic image pairs each including two images of an object viewed from mutually different viewpoints are arranged in a temporal order;
generating a synthetic image in the temporal order by performing a predetermined operation on luminance values of the two images,
wherein the predetermined operation comprises dividing the luminance value of each pixel in one image by two, the result of which is subtracted from the luminance value of each corresponding pixel in another image; and
sequentially selecting and outputting any one of the two images and the synthetic image in the temporal order so that a result of a time integral during a predetermine period of an output thereof offsets any one of the two images.

* * * * *